United States Patent
Tone et al.

(10) Patent No.: US 12,136,048 B2
(45) Date of Patent: Nov. 5, 2024

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Yuta Tone, Nagoya (JP); Yukinori Ii, Toyota (JP); Tadayuki Tanaka, Nagoya (JP); Naoki Ishizuka, Nagoya (JP); Yuichiro Yano, Nagakute (JP); Nariaki Amano, Nagoya (JP); Yusuke Maeda, Miyoshi (JP); Kei Yazaki, Okazaki (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 17/720,559

(22) Filed: Apr. 14, 2022

(65) Prior Publication Data
US 2022/0374788 A1   Nov. 24, 2022

(30) Foreign Application Priority Data
May 24, 2021 (JP) ................................ 2021-087250

(51) Int. Cl.
*G06Q 10/02* (2012.01)

(52) U.S. Cl.
CPC .................... *G06Q 10/02* (2013.01)

(58) Field of Classification Search
CPC ...................................................... G06Q 10/02
See application file for complete search history.

(56) References Cited

U.S. PATENT DOCUMENTS

| | | | |
|---|---|---|---|
| 8,788,301 B1 | 7/2014 | Marlow et al. | |
| 2017/0220998 A1* | 8/2017 | Horn | H04L 51/52 |
| 2020/0125355 A1* | 4/2020 | Aust | H04W 4/44 |
| 2021/0090448 A1* | 3/2021 | Raptopoulos | G05D 1/0088 |
| 2023/0334929 A1* | 10/2023 | Pazzi | G07C 9/00309 |
| 2023/0382406 A1* | 11/2023 | Roberts | G06Q 10/02 |
| 2023/0415764 A1* | 12/2023 | Cserna | G06Q 90/20 |

FOREIGN PATENT DOCUMENTS

| | | | | |
|---|---|---|---|---|
| FR | 2928761 A1 * | 9/2009 | | G06Q 50/28 |
| WO | 2019/009020 A1 | 1/2019 | | |
| WO | WO-2020041145 A1 * | 2/2020 | | G06F 16/29 |
| WO | WO-2023081481 A1 * | 5/2023 | | G06Q 10/063112 |

* cited by examiner

*Primary Examiner* — Jean Paul Cass
(74) *Attorney, Agent, or Firm* — Sughrue Mion, PLLC

(57) ABSTRACT

A controller is provided which is configured to perform receiving, from a terminal of a user, a request for moving a component included in a first vehicle to a second vehicle, and generating, upon receipt of the request from the terminal of the user, information for reserving a predetermined facility in which the component is moved from the first vehicle to the second vehicle.

12 Claims, 11 Drawing Sheets

COMPONENT INFORMATION DB

| COMPONENT ID | REMOVAL TIME | INSTALLATION TIME |
|---|---|---|
| A001 | 1:00 | 1:00 |
| A002 | 0:30 | 0:30 |
| A003 | 2:00 | 2:00 |
| A004 | 1:30 | 2:30 |
| . . . | . . . | . . . |

Fig. 4

FACILITY INFORMATION DB

| FACILITY ID | COMPONENT ID | LOCATION | AVAILABLE RESERVATION DATE AND TIME |
|---|---|---|---|
| B001 | A001<br>A002 | × × × | MAY 10, 2021<br>10:00 – 12:00 |
| B001 | A001<br>A002 | × × × | MAY 10, 2021<br>13:00 – 17:00 |
| B002 | A001<br>A002<br>A003 | × × × | MAY 11, 2021<br>13:00 – 15:00 |
| . . . | . . . | . . . | . . . |

Fig. 5

RESERVATION INFORMATION DB

| USER ID | FACILITY ID | COMPONENT ID | FIRST VEHICLE | REMOVAL DATE AND TIME |
|---|---|---|---|---|
| U001 | B001 | A001 | V001 | MAY 10, 2021 10:30 – 11:30 |
| ... | ... | ... | ... | ... |

| SECOND VEHICLE | INSTALLATION DATE AND TIME |
|---|---|
| V002 | MAY 10, 2021 13:30 – 14:30 |
| ... | ... |

Fig. 6

INFORMATION PROCESSING APPARATUS AND INFORMATION PROCESSING METHOD

CROSS REFERENCE TO THE RELATED APPLICATION

This application claims the benefit of Japanese Patent Application No. 2021-087250, filed on May 24, 2021, which is hereby incorporated by reference herein in its entirety.

BACKGROUND

Technical Field

The present disclosure relates to an information processing apparatus, an information processing method, and a non-transitory storage medium storing a program.

Description of the Related Art

There has been known a technique for updating software of an electronic control unit (ECU) mounted on a vehicle (for example, Patent Literature 1).

CITATION LIST

Patent Literature

Patent Literature 1: International Publication No. WO 2019/009020

SUMMARY

An object of the present disclosure is to facilitate the movement of components between vehicles.

One aspect of the present disclosure is directed to an information processing apparatus including a controller configured to perform:
  receiving, from a terminal of a user, a request to move a component included in a first vehicle to a second vehicle; and
  generating, upon receipt of the request from the terminal of the user, information for reserving a predetermined facility in which the component is moved from the first vehicle to the second vehicle.

Another aspect of the present disclosure is directed to an information processing method for causing a computer to perform:
  receiving, from a terminal of a user, a request to move a component included in a first vehicle to a second vehicle; and
  generating, upon receipt of the request from the terminal of the user, information for reserving a predetermined facility in which the component is moved from the first vehicle to the second vehicle.

A further aspect of the present disclosure is directed to a non-transitory storage medium storing a program for causing a computer to perform:
  receiving, from a terminal of a user, a request to move a component included in a first vehicle to a second vehicle; and
  generating, upon receipt of the request from the terminal of the user, information for reserving a predetermined facility in which the component is moved from the first vehicle to the second vehicle.

A still further aspect of the present disclosure is directed to the program described above.

According to the present disclosure, the movement of a component between vehicles can be facilitated.

BRIEF DESCRIPTION OF THE DRAWINGS

FIG. 4 illustrates an example of a table structure of component information stored in a component information DB;

FIG. 5 is a view illustrating an example of a table configuration of facility information stored in a facility information DB;

FIG. 6 is a view illustrating an example of a table configuration of reservation information stored in a reservation information DB;

DESCRIPTION OF THE EMBODIMENTS

Figure 1:
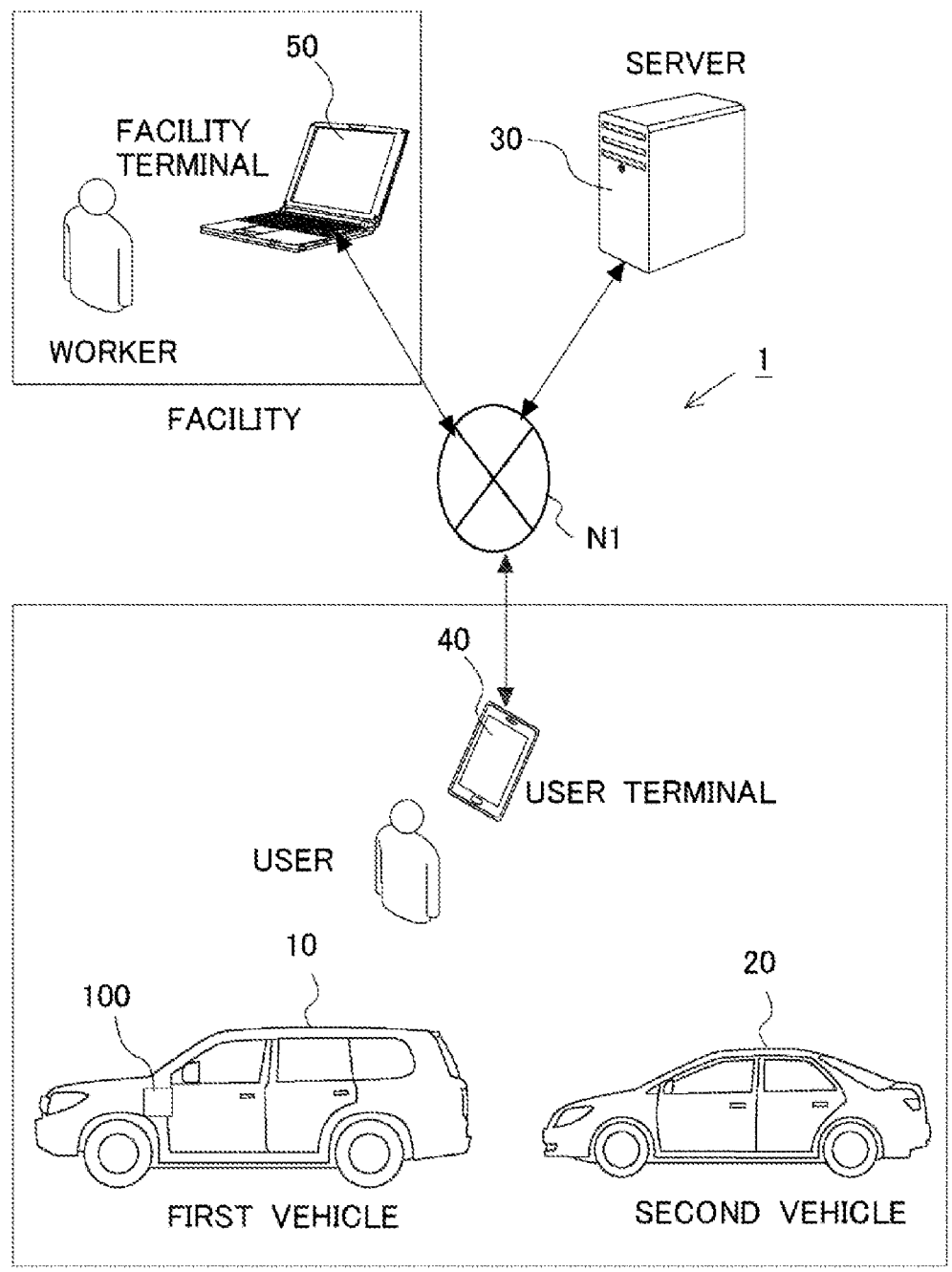
FIG. 1 is a view illustrating a schematic configuration of a system according to an embodiment.

An information processing apparatus, which is one of the aspects of the present disclosure, includes a controller configured to perform receiving, from a terminal of a user, a request to move a component included in a first vehicle to a second vehicle, and generating, upon receipt of the request from the terminal of the user, information for reserving a predetermined facility in which the component is moved from the first vehicle to the second vehicle.

The first vehicle and the second vehicle are, for example, vehicles owned by the same user. For example, when the user replaces the first vehicle with the second vehicle, the request to move the component in the first vehicle to the second vehicle is transmitted from the terminal of the user. The component is, for example, a device or part that is fixed to the first vehicle. Also, the component can include software. In addition, the component may also be a component that is difficult for a general user to move to another vehicle. When removing the component from the first vehicle or attaching the component to the second vehicle, for example, the vehicle may need to be disassembled, or special tools may be required, or software may need to be updated, and hence the user may have difficulty in doing the work himself or herself.

In such a case, the user may transmit the request from the terminal of the user to move the component from the first vehicle to the second vehicle in the predetermined facility. Upon receipt of the request, the controller generates information for reserving the predetermined facility in order to move the component. The predetermined facility is, for example, a place where equipment capable of moving the component between the vehicles is provided and where a worker capable of moving the component is present.

Here, when the same user has the first vehicle and the second vehicle, it may be difficult to deposit both vehicles in the predetermined facility at the same time. For example, it can be considered that the user leaves the predetermined facility in the first vehicle after detaching or removing the component from the first vehicle, and then visits the predetermined facility in the second vehicle to attach or install the component. Therefore, for example, the controller generates information for reserving the predetermined facility in order to remove detach the component from the first vehicle or for reserving the predetermined facility in order to install the component to the second vehicle. This information is transmitted to, for example, a terminal of the predetermined facility. In this way, the predetermined facility can be reserved for moving the component, so that the user can replace the component by going to the predetermined facility in the first vehicle at a reserved time.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to a first embodiment. In the example of FIG. 1, the system 1 includes a server 30, a user terminal 40, and a facility terminal 50. The system 1 is a system that reserves a service for moving a component 100 from a first vehicle 10 to a second vehicle 20 in a predetermined facility. The first vehicle 10 and the second vehicle 20 are vehicles owned by the same user. The first vehicle 10 is a vehicle that is originally equipped with the component 100. On the other hand, the second vehicle 20 is a vehicle that is not equipped with the component 100. The second vehicle 20 may be a vehicle equipped with a component which is replaceable with the component 100 and which is inferior in performance to the component 100. The component 100 is, for example, a component that, when installed to the second vehicle 20, enhances the performance of the second vehicle 20.

Enhanced performance includes higher properties or capabilities, and better appearance. For example, it is assumed that an old seat of the second vehicle 20 will be replaced with a new seat of the same type which was attached to the first vehicle 10, or that a fabric seat of the second vehicle 20 will be replaced with a genuine leather seat which was attached to the first vehicle 10. For example, it is also assumed that a sunroof is replaced from the first vehicle 10 to the second vehicle 20 as the component 100. In addition, for example, it is also assumed that the component 100 after a minor change or a full model change is replaced from the first vehicle 10, which is a vehicle after the minor change or the full model change, to the second vehicle 20, which is a vehicle before the minor change or the full model change.

In addition, as an example of the component 100, there can be mentioned an advanced safety system (a collision damage mitigation brake, an erroneous start suppression control device, an inter-vehicle distance control device, a lane departure suppression device, a rear side approaching vehicle alert device, a headlight automatic switching device, or the like). For example, in cases where the first vehicle 10 is equipped with the latest advanced safety system and the second vehicle 20 is equipped with an advanced safety system of one generation before, it can be said that the performance of the second vehicle 20 is improved by installing the latest advanced safety system removed from the first vehicle 10 to the second vehicle 20. Similarly, for example, in cases where the first vehicle 10 is equipped with an advanced safety system of one generation before and the second vehicle 20 is equipped with an advanced safety system of two generations before, it can be said that the performance of the second vehicle 20 is improved by installing the advanced safety system of one generation before removed from the first vehicle 10 to the second vehicle 20. In this case, the manufacturer may have discontinued the production of the advanced safety system of the one generation before, and it may be difficult to newly equip the advanced safety system of the one generation before, but the advanced safety system of the one generation before may be available if it is a used one.

Here, note that in the present embodiment, the component 100 is described as an object having a physical form, but the present invention can be similarly applied to software that does not have a physical form. In addition, for example, the present invention is also applicable to replacing an ECU that controls each of the vehicles. In this case, the hardware as well as its software may be replaced, or only the software may be moved. Moreover, the right to use the software may be transferred from the first vehicle 10 to the second vehicle 20, so that the software can be used or downloaded in the second vehicle 20.

In addition, the component 100 may be, for example, a component that is equipped or installed on the first vehicle 10 by being selected from manufacturer options when the first vehicle 10 is purchased new, or a component that is equipped or installed on the first vehicle 10 when the first vehicle 10 is manufactured. The component to be installed by being selected from the manufacturer options is equipped on the first vehicle 10 in a manufacturing process of the first vehicle 10 by an automobile manufacturer, for example. Accordingly, the component 100, which is installed by being selected from manufacturer options, may be difficult to install after the vehicle has been completed or produced. According to the present embodiment, such a component 100 can also be replaced.

The facility in which the component 100 is replaced is, for example, an automobile manufacturer, an automobile maintenance shop, an automobile repair shop, an automobile dealer, an automobile parts dealer, an automobile accessory dealer, or a home improvement center. The worker may be, for example, a mechanic or an employee of the facility.

The user requests the server 30 to replace the component 100 by using the user terminal 40. The user terminal 40 may be a terminal owned by the user or a terminal of an automobile dealer. The user who requests the replacement of the component 100 may be the owner of the first vehicle 10 and the second vehicle 20, or may be an employee or the like of an automobile dealer requested by this owner. In response to a request from the user terminal 40, the server 30 reserves a facility for replacing the component 100. This reservation includes a reservation for removing the component 100 from the first vehicle 10 and a reservation for attaching or installing the component 100 to the second vehicle 20.

At the time reserved for removing the component 100 from the first vehicle 10, the user brings the first vehicle 10 into the facility. Then, a worker removes the component 100 in the facility. An alternative component may be attached or installed to the first vehicle 10 from which the component 100 has been removed. This alternative component may be, for example, a cover that covers an opening in the space from which the component 100 has been removed. The first vehicle 10 with the component 100 removed is allowed to leave the facility by the user. The component 100 thus removed is stored in the facility. Alternatively, the removed component 100 may be carried back by the user in the first vehicle 10 and then carried to the facility in the second vehicle 20.

Then, at the time reserved for installing the component 100 to the second vehicle 20, the user brings the second vehicle 20 into the facility, and a worker installs the component 100 in the facility. When the component 100 is installed to the second vehicle 20, the user brings the second vehicle 20 out of the facility. At this time, the user may pay the facility a wage for replacing the component 100 and a storage fee for the component 100.

In this way, the user can improve the performance of the second vehicle 20 by installing the component 100 on the second vehicle 20. In addition, by using the component 100 that has been used so far, it is not necessary to newly purchase the component 100. Also, in cases where the component 100 is a component installed at the time of manufacture, it may be difficult for the user himself or herself to replace the component 100, but even such a component can be replaced by a worker in the facility.

The server 30, the user terminal 40, and the facility terminal 50 are connected to one another via a network N1. Here, note that the network N1 is, for example, a worldwide public communication network such as the Internet or the like, and a WAN (Wide Area Network) or other communication networks may be adopted. Also, the network N1 may include a telephone communication network such as a mobile phone network or the like, and/or a wireless communication network such as Wi-Fi (registered trademark) or the like.

Figure 2:
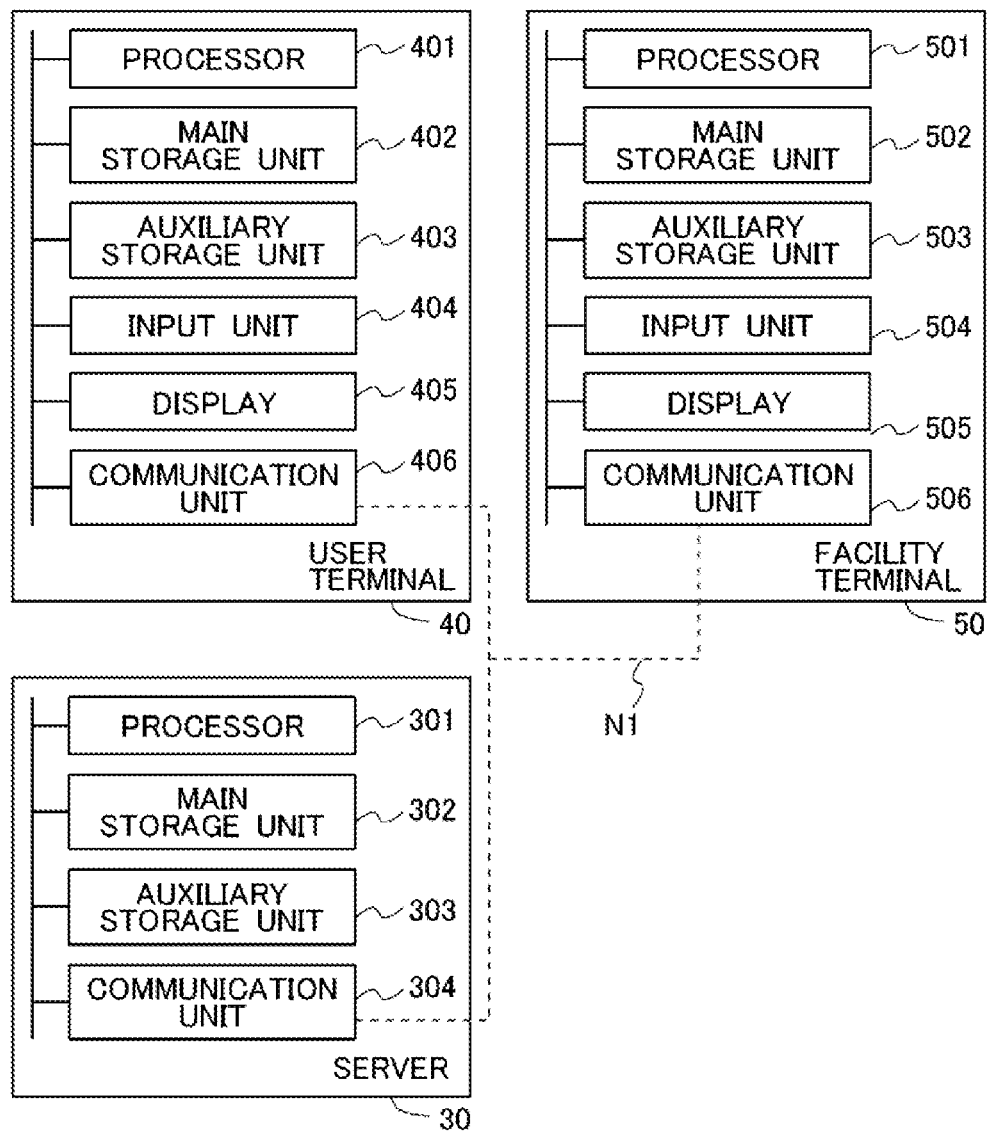
FIG. 2 is a block diagram schematically illustrating an example of a configuration of each of a server, a user terminal and a facility terminal, which together constitute the system according to the embodiment.

Next, hardware configurations of the server 30, the user terminal 40, and the facility terminal 50 will be described with reference to FIG. 2. FIG. 2 is a block diagram schematically illustrating an example of a configuration of each of the server 30, the user terminal 40 and the facility terminal 50, which together constitute the system 1 according to the present embodiment.

The server 30 has a configuration of a general computer. The server 30 provides services to users and workers. The server 30 includes a processor 301, a main storage unit 302, an auxiliary storage unit 303, and a communication unit 304. These components are connected to one another by means of a bus. Note that the server 30 is an example of an information processing apparatus. Also, the processor 301 is an example of a controller. In addition, the main storage unit 302 or the auxiliary storage unit 303 is an example of a storage unit.

The processor 301 is a CPU (Central Processing Unit), a DSP (Digital Signal Processor), or the like. The processor 301 controls the server 30 thereby to perform various information processing operations. The main storage unit 302 is a RAM (Random Access Memory), a ROM (Read Only Memory), or the like. The auxiliary storage unit 303 is an EPROM (Erasable Programmable ROM), a hard disk drive (HDD), a removable medium, or the like. The auxiliary storage unit 303 stores an operating system (OS), various programs, various tables, and the like. The processor 301 loads a program stored in the auxiliary storage unit 303 into a work area of the main storage unit 302 and executes the program, so that each component or the like is controlled through the execution of the program. As a result, the server 30 realizes functions that match predetermined purposes. The main storage unit 302 and the auxiliary storage unit 303 are computer readable recording media. Here, note that the server 30 may be a single computer or a plurality of computers that cooperate with one another. In addition, the information stored in the auxiliary storage unit 303 may be stored in the main storage unit 302. Also, the information stored in the main storage unit 302 may be stored in the auxiliary storage unit 303.

The communication unit 304 is a means or unit that communicates with the user terminal 40 and the facility terminal 50 via the network N1. The communication unit 304 is, for example, a LAN (Local Area Network) interface board, a wireless communication circuit for wireless communication, or the like. The LAN interface board or the wireless communication circuit is connected to the network N1.

Now, the user terminal 40 will be described. The user terminal 40 is, for example, a smart phone, a mobile phone, a tablet terminal, a personal information terminal, a wearable computer (such as a smart watch or the like), or a small computer such as a personal computer (PC).

The user terminal 40 includes a processor 401, a main storage unit 402, an auxiliary storage unit 403, an input unit 404, a display 405, and a communication unit 406. These components are connected to one another by means of a bus. The processor 401, the main storage unit 402 and the auxiliary storage unit 403 of the user terminal 40 are the same as the processor 301, the main storage unit 302 and the auxiliary storage unit 303 of the server 30, respectively, and hence, the description thereof will be omitted.

The input unit 404 is a means or unit that receives an input operation performed by the user, and is, for example, a touch panel, a mouse, a keyboard, a microphone, or the like. The display 405 is a means or unit that presents information to the user, and is, for example, an LCD (Liquid Crystal Display), an EL (Electroluminescence) panel, or the like. Note that the input unit 404 and the display 405 may be configured as a single touch panel display.

The communication unit 406 is a communication means or unit that connects the user terminal 40 to the network N1. The communication unit 406 is, for example, a circuit that communicates with other devices (e.g., the server 30 and the like) via the network N1 by making use of a mobile communication service (e.g., a telephone communication network such as 5G (5th Generation), 4G (4th Generation), 3G (3rd Generation), or LTE (Long Term Evolution)) or a wireless communication network such as Wi-Fi (registered trademark) or the like.

Next, the facility terminal 50 will be described. The facility terminal 50 is a smart phone, a mobile phone, a tablet terminal, a personal information terminal, a wearable computer (such as a smart watch or the like), or a small computer such as a personal computer (PC).

The facility terminal 50 includes a processor 501, a main storage unit 502, an auxiliary storage unit 503, an input unit 504, a display 505, and a communication unit 506. These components are connected to one another by means of a bus. The processor 501, the main storage unit 502, the auxiliary storage unit 503, the input unit 504, the display 505, and the communication unit 506 of the facility terminal 50 are the same as the processor 401, the main storage unit 402, the auxiliary storage unit 403, the input unit 404, the display 405, and the communication unit 406 of the user terminal 40, respectively, and hence, the description thereof will be omitted.

Figure 3:
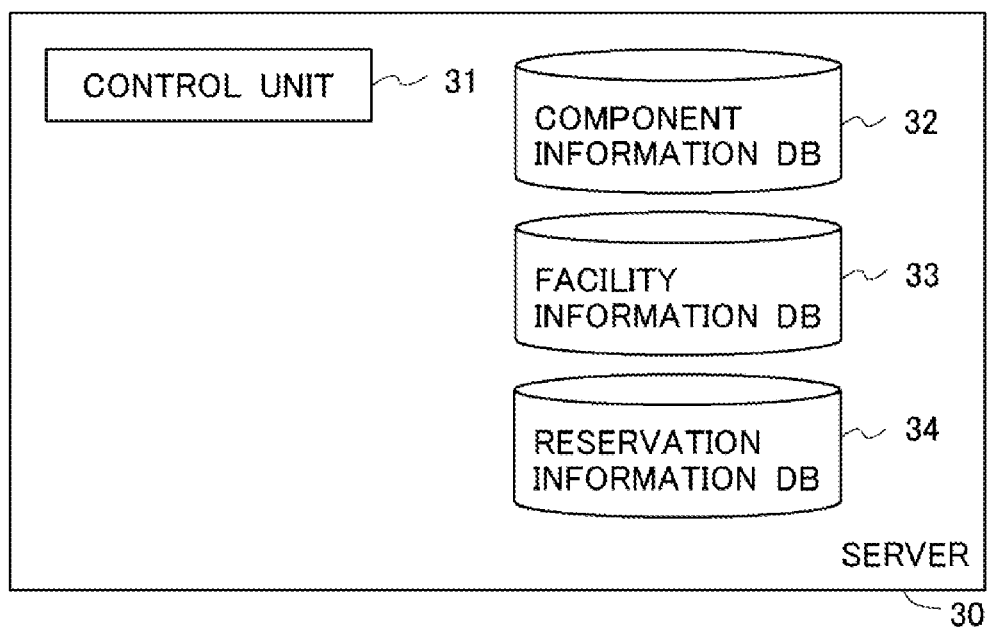
FIG. 3 is a diagram illustrating an example of a functional configuration of the server.

Now, the functions of the server 30 will be described. FIG. 3 is a diagram illustrating an example of a functional configuration of the server 30. The server 30 includes, as functional components, a control unit 31, a component information DB 32, a facility information DB 33, and a reservation information DB 34. The processor 301 of the server 30 executes the processing of the control unit 31 by a computer program on the main storage unit 302. Note that a part of the processing of the control unit 31 may be executed by another computer connected to the network N1.

The component information DB 32, the facility information DB 33, and the reservation information DB 34 are built by a program of a database management system (DBMS) that is executed by the processor 301 to manage data stored in the auxiliary storage unit 303. The component information DB 32, the facility information DB 33, and the reservation information DB 34 are, for example, relational databases.

The control unit 31 receives a request from the user terminal 40 to make a reservation to move the component 100 included in the first vehicle 10 to the second vehicle 20. This request is hereinafter also referred to as a reservation request. The reservation request includes information necessary for the control unit 31 to reserve a facility. The reservation request includes, for example, information that can identify the user (user ID) and information about each of an area where the user wants to replace the component 100, the component 100, the first vehicle 10 and the second vehicle 20. The information about the area may be information that is based on an administrative division such as a city, town, or village where the user wants to replace the component 100. Alternatively, the information about the area may be information about the location of the user, such as the address of the user. Then, a predetermined area including the location of the user may be set as the area where the user wants to replace the component 100. The reservation request is transmitted from the user terminal 40 to the server 30.

The control unit 31, which has received the reservation request, selects a facility that can be reserved by the user. Here, the control unit 31 receives information about available reservation dates and times from the facility terminal 50 at any time. The available reservation dates and times are the dates and times at which there is availability for reservation at the facility, and the date and time at which the component 100 can be installed (hereinafter, referred also to as the installable date and time), and the date and time at which the component 100 can be removed (hereinafter, referred also to as the removable date and time). Note that the information about facilities has been stored in the facility information DB 33. The facility information DB 33 will be described later. The information about the available reservation dates and times is input to the facility terminal 50 by a worker, for example. Upon receiving the information about the available reservation dates and times, the control unit 31 selects a facility by determining whether there is an available time frame in which the component 100 can be replaced. The time required to replace the component 100 has been stored in the component information DB 32. The component information DB 32 will be described later. When the facility is selected, the control unit 31 transmits to the user terminal 40 information about the facility and information about the installable dates and times and the removable dates and times of the component 100. By the transmission of this information, the user can select from among the available reservation dates and times.

Thereafter, the control unit 31 receives the reservation information from the user terminal 40. The reservation information is information for the user to request a reservation for replacement of the component 100. The reservation information includes information about each of the user ID, the facility to be reserved, the component 100, the first vehicle 10, the date and time at which the component 100 will be removed from the first vehicle 10, the second vehicle 20, and the date and time at which the component 100 will be installed to the second vehicle 20.

The control unit 31, which has received the reservation information from the user terminal 40, generates information for reserving the facility to move the component 100 from the first vehicle 10 to the second vehicle 20. Then, the control unit 31 transmits the information thus generated to the facility terminal 50. The information transmitted to the facility terminal 50 at this time includes information about each of the user, the component 100, the first vehicle 10, the date and time at which the component 100 is removed from the first vehicle 10, the second vehicle 20, and the date and time at which the component 100 is installed to the second vehicle 20. The information about the user includes information about the name of the user and a contact address thereof (such as a telephone number or an e-mail address).

Also, the control unit 31 transmits information indicating that the reservation has been completed to the user terminal 40 and the facility terminal 50. Here, note that the control unit 31 may transmit information indicating that the reservation has been completed to the user terminal 40, in the case where the information regarding that the reservation has been confirmed has been received from the facility terminal 50. Further, the control unit 31 stores the reservation information in the reservation information DB 34. The reservation information DB 34 will be described later.

FIG. 4 is a diagram illustrating a table configuration of component information stored in the component information DB 32. The component information DB 32 is a database that is used to search for the times required to install and remove each component 100. A component information table includes fields of component ID, removal time, and installation time. Information for identifying each component 100 (component ID) is entered in the component ID field. A component ID is assigned to each component 100 by the control unit 31. In the removal time field, information about the time required to remove each component 100 is entered. In the installation time field, information about the time required to install each component 100 is entered. The times required for installation and removal may be expressed in terms of standard man-hours. Further, even if components 100 are the same, the installation time and the removal time thereof may differ depending on vehicle types or models, and hence, a component ID may be set for each vehicle type or model. Each piece of information stored in the component information DB 32 has been entered in advance by, for example, an administrator of the server 30 or a worker of each facility.

FIG. 5 is a view illustrating a table configuration of facility information stored in the facility information DB 33. The facility information DB 33 is a database that is used when searching for a facility that copes with each component 100. A facility information table includes fields of facility ID, component ID, location, and available reservation date and time. In the facility ID field, information for identifying each facility (facility ID) is entered. A facility ID is assigned to each facility by the control unit 31. In the component ID field, information for identifying each component 100 of which installation and removal are coped with by each facility (component ID) is entered. In the location field, information about the location of each facility (e.g., information about an address, an area, a mesh code, or coordinates) is entered. In the available reservation date and time field, information about dates and times at which each component 100 can be removed or installed in each facility is entered. The information about the available reservation dates and times may be transmitted from the facility terminal 50 at predetermined time intervals, or may be transmitted from the facility terminal 50 when a predetermined input is made to the facility terminal 50, or may be transmitted from the facility terminal 50 in response to a request from the control unit 31. The available reservation dates and times may be represented by time frames.

FIG. 6 is a view illustrating a table configuration of reservation information stored in the reservation information DB 34. The reservation information DB 34 is a database that stores information about each reservation made by the control unit 31. A reservation information table includes fields of user ID, facility ID, component ID, first vehicle, removal date and time, second vehicle, and installation date and time. In the user ID field, information for identifying a user (user ID) is entered. In the facility ID field, information for identifying a facility (facility ID) is entered. In the component ID field, information for identifying a component 100 (component ID) is entered. In the first vehicle field, information for identifying a first vehicle 10 is entered. As the information for identifying the first vehicle 10, for example, a vehicle type or model can be mentioned. In the removal date and time field, information about a date and time reserved for removing the component 100 from the first vehicle 10 is entered. In the second vehicle field, information for identifying a second vehicle 20 is entered. As the information for identifying the second vehicle 20, for example, a vehicle type or model can be mentioned. In the installation date and time field, information about a date and time reserved for installing the component 100 on the second vehicle 20 is entered.

Figure 7:
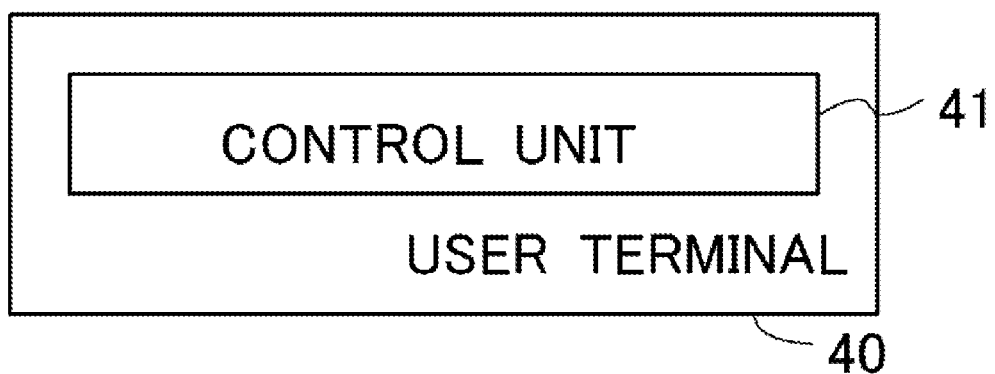
FIG. 7 is a diagram illustrating an example of a functional configuration of the user terminal.

Next, the functions of the user terminal 40 will be described. FIG. 7 is a diagram illustrating an example of a functional configuration of the user terminal 40. The user terminal 40 includes a control unit 41 as its functional component. The processor 401 of the user terminal 40 executes the processing of the control unit 41 by a computer program on the main storage unit 402.

The control unit 41 transmits a request for making a reservation for the removal of the component 100 from the first vehicle 10 and for installation of the component 100 on the second vehicle 20 in accordance with the user's input to the input unit 404. The control unit 41 executes predetermined application software to display on the display 405 a screen requesting the user to input the user ID, the first vehicle 10, the second vehicle 20, and the component 100. When the user inputs these pieces of information through the input unit 404, the control unit 41 transmits the information to the sever 30 via the communication unit 406. Note that the request for this reservation may be made, for example, on a website of the Internet. In this case, the control unit 41 accesses a predetermined website according to the input of the user. When accessing the predetermined website, the user will be asked to input the user ID, the first vehicle 10, the second vehicle 20, and the component 100. The control unit 41 displays a screen on the display 405 that prompts the user to input these pieces of information. When the user inputs these pieces of information through the input unit 404, the control unit 41 transmits the information to the sever 30 via the communication unit 406.

In addition, upon receipt of information about the available reservation dates and times from the sever 30, the control unit 41 displays a screen for prompting the user to make a reservation. For example, a list of available reservation facilities as well as available reservation dates and times is displayed on the display. When the user inputs facilities as well as dates and times, the control unit 41 transmits the information about the facilities as well as the dates and times thus input by the user to the sever 30 in association with the user ID.

Figure 8:
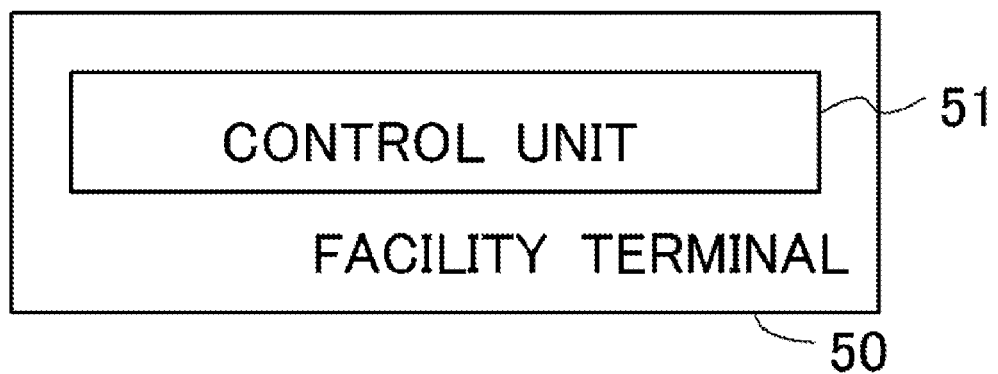
FIG. 8 is a diagram illustrating an example of a functional configuration of the facility terminal.

Next, the functions of the facility terminal 50 will be described. FIG. 8 is a diagram illustrating an example of a functional configuration of the facility terminal 50. The facility terminal 50 includes a control unit 51 as its functional component. The processor 501 of the facility terminal 50 executes the processing of the control unit 51 by a computer program on the main storage unit 502.

When a worker inputs facility information, the control unit 51 transmits the facility information to the sever 30. The facility information includes information about the component IDs of components 100 that can be coped with, a facility ID, and dates and times at which reservations can be made (available dates and times). This facility information may be input, for example, on a website on the Internet. In this case, the control unit 51 accesses a predetermined website according to the input of the worker. When accessing the predetermined website, the worker will be asked to input a facility ID, components 100 and available reservation dates and times. The control unit 51 displays a screen on the display 505 that prompts the worker to input these pieces of information. When the worker inputs these pieces of information through the input unit 504, the control unit 51 transmits them to the sever 30 via the communication unit 506.

In addition, upon receiving the information about the completion of the reservation from the sever 30, the control unit 51 stores, in the auxiliary storage unit 503, information about each of the user, the component 100, the first vehicle 10, the removal date and time, the second vehicle 20, and the installation date and time, which are included in the received information. For example, by performing a predetermined operation through the input unit 504, the worker can view the information about the completion of the reservation through the display 505.

Figure 9:
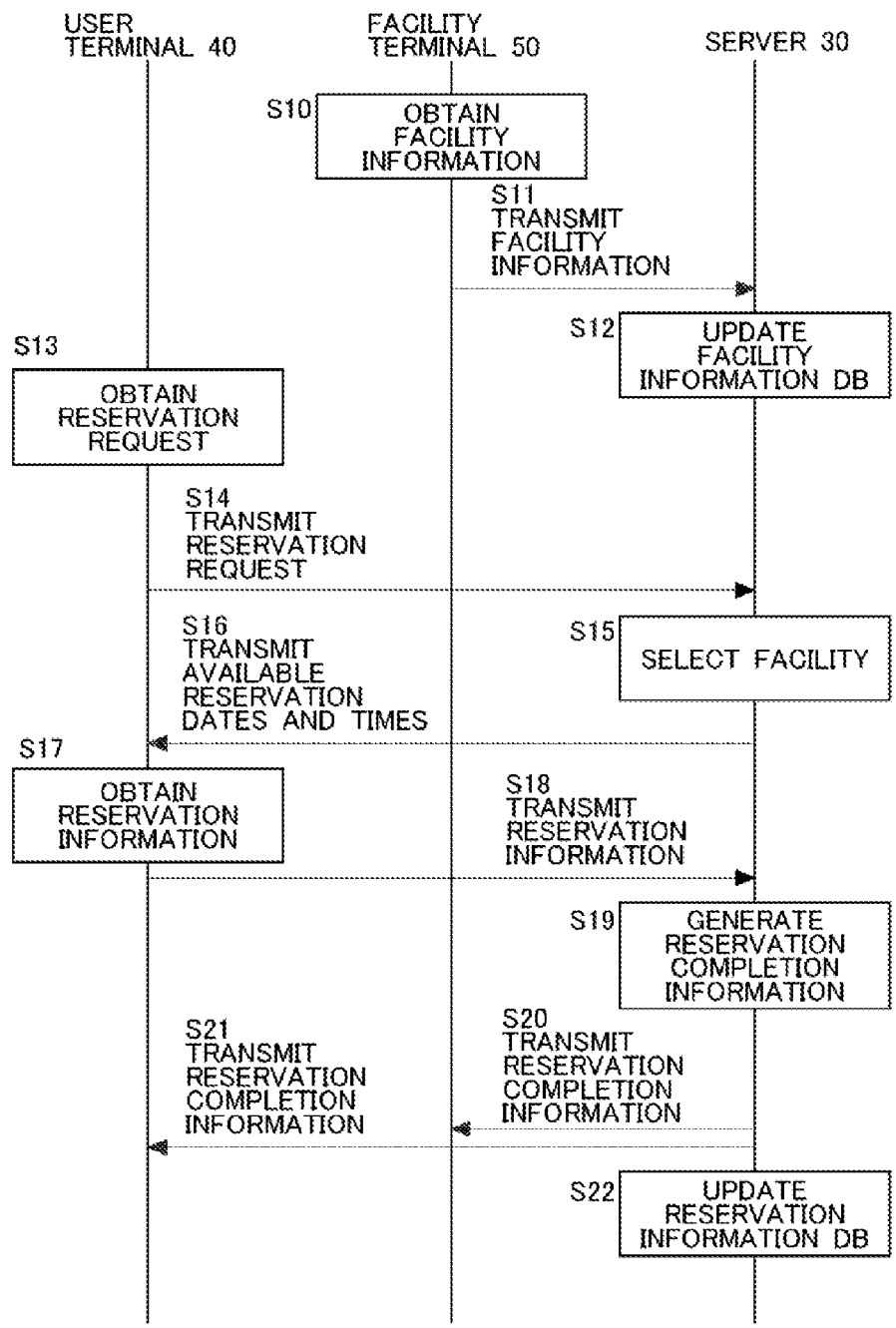
FIG. 9 is a sequence diagram illustrating the overall processing of the system.

Now, the processing of the system 1 as a whole will be described. FIG. 9 is a sequence diagram illustrating the overall processing of the system 1. Note that in the following description, it is assumed that component information has already been stored in the component information DB 32. In FIG. 9, when the worker inputs facility information (i.e., information about each of a facility ID, component IDs, a location, and available reservation dates and times) to the facility terminal 50, the facility terminal 50 obtains the facility information (S10). The facility terminal 50 transmits the facility information to the sever 30 (S11). The server 30, which has obtained the facility information, updates the facility information DB 33 in accordance with the facility information (S12). Note that in FIG. 9, the facility terminal 50 first transmits the facility information, but the facility information may be transmitted to the server 30 as appropriate.

Next, the user inputs to the user terminal 40 so as to reserve the removal and installation of the component 100. At this time, the user terminal 40 obtains a reservation request (information about each of the user ID, the area, the component 100, the first vehicle 10, and the second vehicle 20) (S13). The reservation request thus obtained is transmitted to the server 30 (S14). The server 30, which has received the reservation request, selects a facility responding to the reservation request based on the information stored in the component information DB 32 and the facility information DB 33 (S15). At this time, the sever 30 extracts, for example, the installation time and the removal time corresponding to the component 100 from the component information DB 32. These times are compared with the available reservation dates and times stored in the facility information DB 33 to extract facilities with available times in which the component 100 can be removed and installed. A facility whose location is within an area desired by the user is selected from among the facilities.

When the facility is selected, the sever 30 transmits information about the available reservation dates and times to the user terminal 40 (S16). The information transmitted at this time also includes information about the facility (i.e., information about the position, name, and the like of the facility). The user terminal 40, which has received the information about the available reservation dates and times, displays a screen prompting the user to input reservation dates and times. In this case, a plurality of time frames may be displayed based on the times required to remove and install the component 100, so that the user may select a time frame for removing the component 100 and a time frame for installing the component 100 from among the plurality of time frames. When there are a plurality of available reservation facilities, time frames may be displayed for each facility so that the user can select a facility and time frames.

The user terminal 40 obtains the reservation information (i.e., information about each of the user ID, the facility, the component 100, the first vehicle 10, the removal date and time, the second vehicle 20, and the installation date and time) according to the input of the user (S17). The user terminal 40 transmits the reservation information to the server 30 (S18). The server 30, which has received the reservation information, generates reservation completion information (S19). The reservation completion information includes information for notifying the user terminal 40 that the reservation has been completed and information for notifying the facility terminal 50 that the reservation has been completed. Information about each of the user, the component 100, the first vehicle 10, the removal date and time, the second vehicle 20, and the installation date and time is transmitted to the facility terminal 50 (S20). Information about each of the facility, the component 100, the first vehicle 10, the removal date and time, the second vehicle 20, and the installation date and time is transmitted to the user terminal 40 (S21).

Then, the server 30 updates the reservation information DB 34 by storing the reservation information (i.e., information about each of the user ID, the facility ID, the component 100, the first vehicle 10, the removal date and time, the second vehicle 20, and the installation date and time) in the reservation information DB 34. (S22).

Here, note that in the example illustrated in FIG. 9, the server 30 obtains reservation information from the user terminal 40 after the server 30 has selected a facility in S15, but this processing is not essential. For example, the server 30 may select, in S15, a facility based on the reservation request transmitted in S14, and then generate reservation completion information in S19. That is, the processing from S16 to S18 can be omitted. In this case, the reservation request obtained in S14 may include information about a desired removal date and time and a desired installation date and time.

Figure 10:
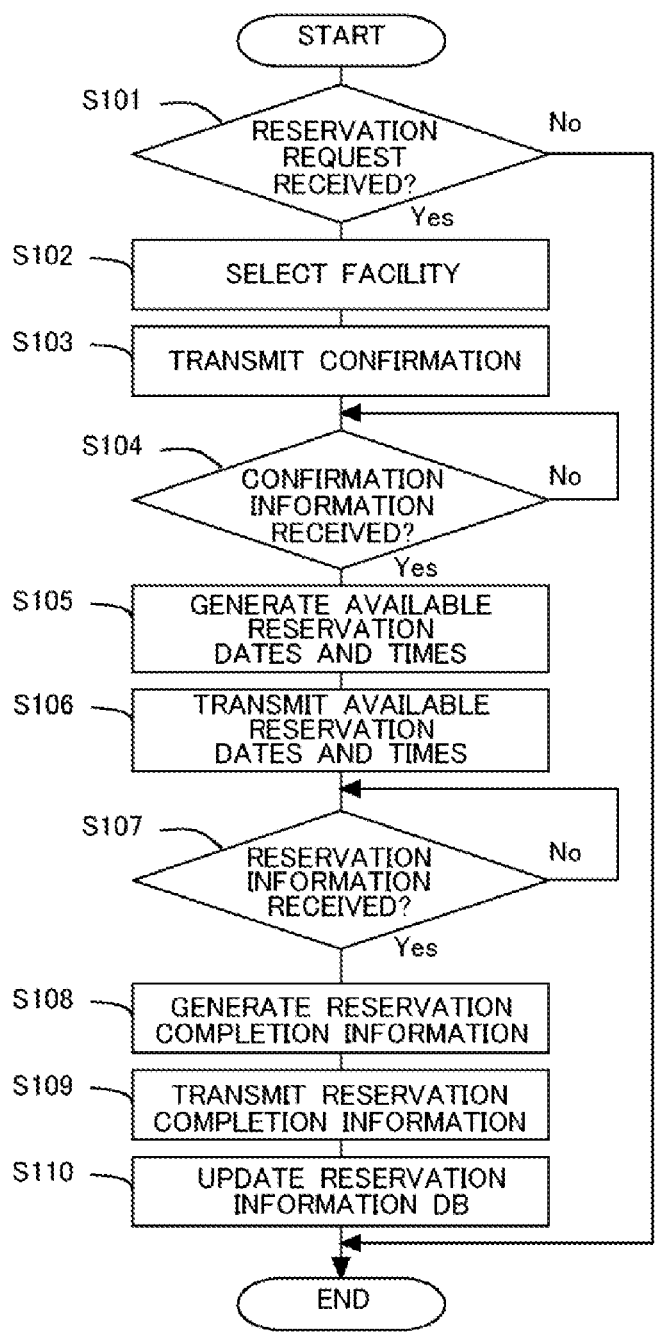
FIG. 10 is a flowchart of reservation processing in the server according to a first embodiment.

Then, the processing in the server 30 will be described. FIG. 10 is a flowchart of reservation processing in the server 30 according to the first embodiment. The reservation processing illustrated in FIG. 10 is executed in the server 30 at predetermined time intervals. Here, note that in the following description, it is assumed that the facility information (i.e., information about each of the facility ID, the component ID, the location, and the available reservation dates and times) is received from the facility terminal 50 at any time. Also, it is assumed that the user and the facility have been registered in the server 30 in advance.

In step S101, the control unit 31 determines whether or not a reservation request has been received from the user terminal 40. The reservation request includes information about each of the user ID, the area, the component 100, the first vehicle 10, and the second vehicle 20. When an affirmative determination is made in step S101, the processing or routine proceeds to step S102, whereas when a negative determination is made, this routine is ended.

In step S102, the control unit 31 selects a facility based on the reservation request, the information stored in the component information DB 32, and the information stored in the facility information DB 33. At this time, the facility which corresponds to both the area included in the reservation request and the component 100 and for which there are available reservation dates and times corresponding to the times required for the removal and installation of the component 100 is extracted from the facility information DB 33.

Then, in step S103, the control unit 31 transmits information for confirming whether or not a reservation may be made to the facility terminal 50 corresponding to the selected facility. At this time, information about each of the component 100, the first vehicle 10, and the second vehicle 20 is transmitted to the facility terminal 50.

In step S104, the control unit 31 determines whether or not confirmation information has been received from the facility terminal 50. The confirmation information includes information about each of the facility ID, the removable date and time, and the installable date and time. When an affirmative determination is made in step S104, the processing proceeds to step S105, whereas when a negative determination is made, the processing of step S104 is executed again. Note that in cases where the confirmation information has not been received from the facility terminal 50 even when a predetermined period of time elapses, the control unit 31 may notify the user terminal 40 that there is no vacancy in the facility, and terminate the present routine. In addition, the processing of step S103 and the processing of step S104 may be omitted. That is, the facility information is received from the facility terminal 50 at any time, and hence, the reservation may be proceeded without confirming with the facility terminal 50.

In step S105, the control unit 31 generates information about available reservation dates and times. The information about the available reservation dates and times includes information about the facility (e.g., the position and name of the facility), and information about the date and time at which the component 100 can be removed and the date and time at which the component 100 can be installed. At this time, each piece of information is generated so that a time frame corresponding to the first vehicle 10 is earlier than a time frame corresponding to the second vehicle 20. Then, in step S106, the control unit 31 transmits the information about the available reservation dates and times to the user terminal 40.

In step S107, the control unit 31 determines whether or not reservation information has been received from the user terminal 40. The reservation information includes information about the user ID and the facility, and information about each of the component 100, the first vehicle 10, the removal date and time, the second vehicle 20, and the installation date and time. When an affirmative determination is made in step S107, the processing proceeds to step S108, whereas when a negative determination is made, the processing of step S107 is executed again. Note that in cases where the reservation information has not been received from the user terminal 40 even after a predetermined period of time elapses, the control unit 31 may terminate the present routine.

In step S108, the control unit 31 generates reservation completion information. The reservation completion information is information for notifying the worker that the reservation has been made, and information for notifying the user that the reservation has been completed. The reservation completion information to be transmitted to the facility terminal 50 includes information about each of the user ID, the component 100, the first vehicle 10, the removal date and time, the second vehicle 20, and the installation date and time. The reservation completion information to be transmitted to the user terminal 40 includes information about the facility, and information about each of the component 100, the first vehicle 10, the removal date and time, the second vehicle 20, and the installation date and time.

In step S109, the control unit 31 transmits the reservation completion information to the user terminal 40 and the facility terminal 50. Then, in step S110, the control unit 31 updates the reservation information DB 34. That is, information about each of the user ID, the facility ID, the component ID, the first vehicle 10, the removal date and time, the second vehicle 20, and the installation date and time is stored in the reservation information DB 34.

As described above, according to the present embodiment, when the user wants to replace the component 100 from the first vehicle 10 to the second vehicle 20, the server 30 can make a reservation to a facility. This allows the user to replace the component 100, thereby eliminating the need to purchase the component 100 for the second vehicle 20. Also, the component 100, which has not already in production and is not available as a new product, can be installed to the second vehicle 20. In addition, used parts can be effectively utilized.

Second Embodiment

In a second embodiment, the user is charged a storage fee for the component 100 from the time the component 100 is removed from the first vehicle 10 to the time the component 100 is installed to the second vehicle 20. Here, the component 100 may be stored in the facility until the component 100 is installed to the second vehicle 20 after the component 100 is removed from the first vehicle 10. In this case, for example, the facility needs to provide a place for storing the component 100. It also becomes necessary for workers to manage the component 100. Thus, the user is charged for these costs. For example, the longer the component 100 is stored, the higher the storage fee will be. In this case, the storage fee corresponding to a storage time may be added to a basic fee. Note that, alternatively, the storage fee may be lower as the time for storing the component 100 is shorter. In this case, an amount of money discounted from the basic fee may be increased as the storage time is shorter. As a further alternative, the shorter the storage time of the component 100, the more incentive may be provided to the user. The incentive could be, for example, a discount coupon that can be used at the facility.

The storage fee may be set, for example, in accordance with the number of days or the amount of time. In addition, when the removal and installation are performed within a predetermined number of days or within a predetermined period of time, the storage fee may not be charged.

Figure 11:
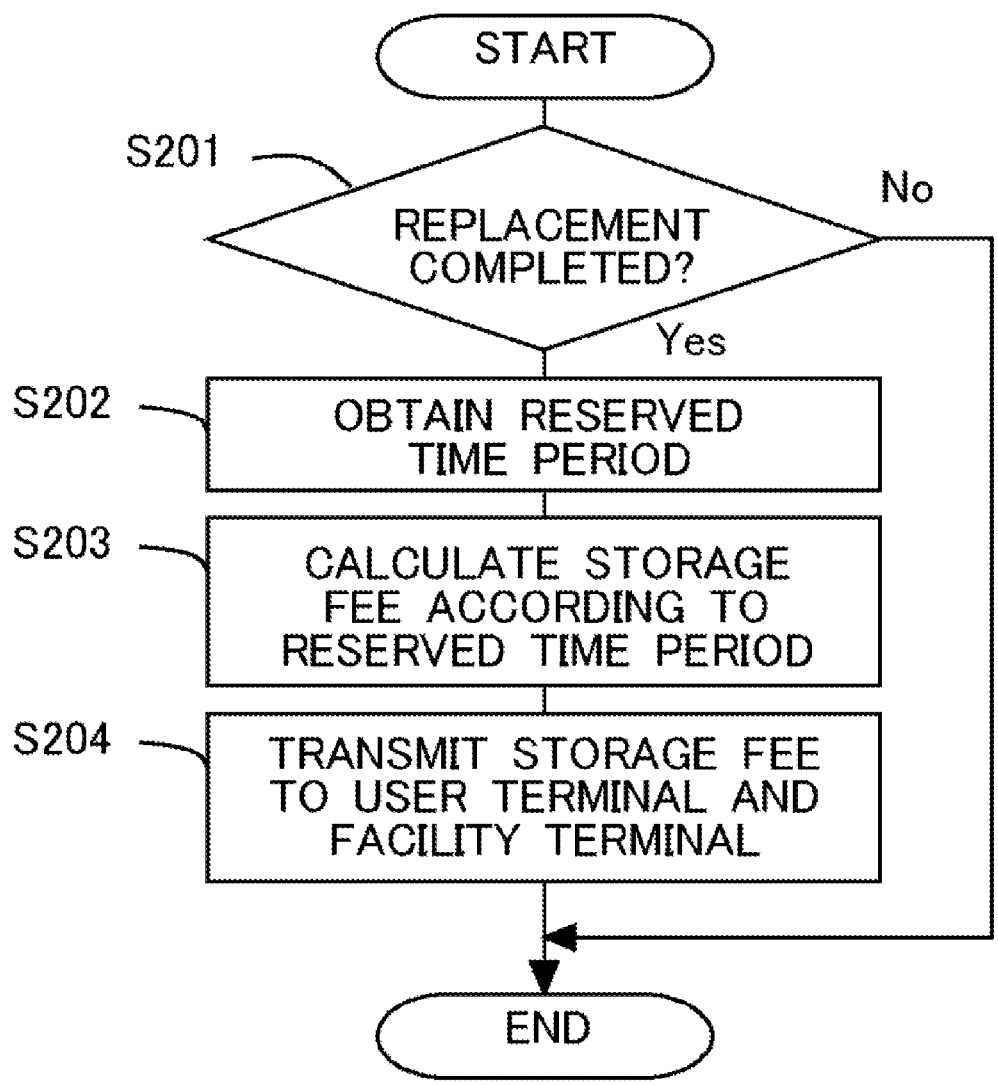
FIG. 11 is a flowchart of processing in a server according to the second embodiment.

Then, the processing in the server 30 will be described. FIG. 11 is a flowchart of processing in the server 30 according to the second embodiment. The processing illustrated in FIG. 11 is executed in the server 30 at predetermined time intervals. In step S201, the control unit 31 determines whether or not the replacement of the component 100 from the first vehicle 10 to the second vehicle 20 has been completed. The control unit 31 may determine that the replacement of the component 100 has been completed, for example, by obtaining from the facility terminal 50 information indicating that the work has been completed. For example, when a reserved time period for installing the component 100 to the second vehicle 20 has elapsed, it may be determined that the replacement of the component 100 has been completed. When an affirmative determination is made in step S201, the processing or routine proceeds to step S202, whereas when a negative determination is made, this routine is ended.

In step S202, the control unit 31 obtains reserved time periods. The control unit 31 obtains the reserved time periods for the first vehicle 10 and the second vehicle 20, respectively, in order to calculate the storage time of the component 100. In step S203, the control unit 31 calculates the storage fee according to the reserved time periods. The control unit 31 calculates, as the storage time, a period of time from an end point of a reserved time period for removing the component 100 from the first vehicle 10 to a start point of a reserved time period for installing the component 100 to the second vehicle 20, and further calculates the storage fee according to the storage time. The relationship between the storage time and the storage fee has been stored in advance in the auxiliary storage unit 303. For example, the longer the storage time, the higher the storage fee. The control unit 31 generates information about the storage fee according to the calculated storage fee.

In step S204, the control unit 31 transmits the information about the storage fee to the user terminal 40 and the facility terminal 50. In the user terminal 40 and the facility terminal 50 that have received this information, the storage fee is displayed on the display 405 and the display 505 to notify the user and the worker of the storage fee. At this time, information about a wage for replacing the component 100 may also be transmitted to the user terminal 40 and the facility terminal 50.

In the above description, the storage fee for the component 100 has been explained, but the storage fee for the first vehicle 10 or the second vehicle 20 may be charged in cases where the facility keeps the first vehicle 10 or the second vehicle 20 for work. For example, the longer the period of time from the completion of removal of the component 100 from the first vehicle 10 to the exit of the first vehicle 10 from the facility, or the longer the period of time from the completion of installation of the component 100 to the second vehicle 20 to the exit of the second vehicle 20 from the facility, the higher the storage fee may be made.

As described above, according to the present embodiment, it is possible to suppress the user from leaving the component 100 in the facility for a long period of time by charging the storage fee to the user in accordance with the storage time of the component 100. As a result, it is possible to suppress a shortage of available space in the storage location. In addition, the facility can receive compensation for storing the component 100.

Other Embodiments

The above-described embodiments are merely examples, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the facility terminal 50 may have some or all of the functions of the server 30.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising:
a storage; and
a controller operatively coupled to the storage,
wherein the storage store one or more instructions and facility information about a predetermined facility that is cap able of removing component from a first vehicle and installing the component to a second vehicle, and
wherein the facility information includes available reservation dates and times of the predetermined facility, and
wherein, upon execution of the instructions, the controller is configured to:
receive, via a wireless communication network, the facility information from a facility terminal related to predetermined facility,
store the received facility information in the storage,
receive, via the wireless communication network from a terminal of a user accessing a website, a request to move the component included in the first vehicle to the second vehicle, the user being an owner of the first vehicle and the second vehicle,
select one or more facilities with available times that are capable of removing the component from the first vehicle and installing the component to the second vehicle in response to the stored facility information and the received request,
transmit, via the wireless communication network, inform about the available reservation dates and times of the selected one or more facilities to the user terminal,
determine whether reservation information has been received from the user terminal, the reservation information being information for reserving any of the one or more facilities selected by the user, and the reservation information including a removal date and time of the component from the first vehicle and an installation date and time removed component to the second vehicle, at any of the one or more facilities selected by the user,
generate reservation completion information for reserving the facility selected by the user so that two frames including a first time frame corresponding to the first vehicle and a second time frame corresponding to the second vehicle are reserved in response to the reception of the reservation information from the user terminal, and
transmit, via the wireless communication network, the generated reservation completion information to the user terminal and the facility terminal.

2. The information processing apparatus according to claim 1, wherein
the controller generates information for reserving the predetermined facility so that the first time frame corresponding to the first vehicle is earlier than the second time frame corresponding to the second vehicle.

3. The information processing apparatus according to claim 1, wherein
the controller generates information about a fee to be charged to the user so that the fee to be charged to the user increases as a time period from an end time point of the first time frame corresponding to the first vehicle to a start time point of the second time frame corresponding to the second vehicle increases.

4. The information processing apparatus according to claim 1, wherein
the storage unit stores a time required to remove the component from the first vehicle and a time required to install the component to the second vehicle.

5. The information processing apparatus according to claim 1, wherein
the component is a component that makes performance of the second vehicle higher after the component is moved to the second vehicle than before the component is moved to the second vehicle.

6. The information processing apparatus according to claim 1, wherein
the component is a component that is installed to the first vehicle at the time of manufacture of the first vehicle.

7. The information processing apparatus according to claim 1, wherein
the component is a component that is capable of being selected by a manufacturer option when the first vehicle is purchased new.

8. An information processing method performed by at least one computer, the method comprising:
receiving, via a wireless communication network, facility information from a facility terminal related to a predetermined facility,
storing the received facility information in a storage of the at least one computer, receiving, via the wireless communication terminal from a terminal of a user accessing a website, a request to move a component included in a first vehicle to a second vehicle;

selecting one or more facilities with available times that are capable of removing the component from the first vehicle and installing the component to the second vehicle in response to the stored facility information and the received request;

transmitting, via the wireless communication network, information about the available reservation dates and times of the selected one or more facilities to the user terminal;

determining whether reservation information has been received from the user terminal, the reservation information being information for reserving any of the one or more facilities selected by the user, and the reservation information including a removal date and time of the component from the first vehicle and an installation date and time of the removed component to the second vehicle, at any of the one or more facilities selected by the user; and generating reservation completion information for reserving the facility selected by the user so that two frames including a first time frame corresponding to the first vehicle and a second time frame corresponding to the second vehicle are reserved in response to the reception of the reservation information from the user terminal; and transmitting, via the wireless communication network, the generated reservation completion information to the user terminal and the facility terminal.

9. The information processing method according to claim 8, wherein
the computer is configured to generate information for reserving the predetermined facility so that the first time frame corresponding to the first vehicle is earlier than the second time frame corresponding to the second vehicle.

10. The information processing method according to claim 8, wherein
the computer is configured to generate information about a fee to be charged to the user so that the fee to be charged to the user increases as a time period from an end time point of the first time frame corresponding to the first vehicle to a start time point of the second time frame corresponding to the second vehicle increases.

11. The information processing method according to claim 8, wherein
the component is a component that is installed to the first vehicle at the time of manufacture of the first vehicle.

12. The information processing method according to claim 8, wherein
the component is a component that is capable of being selected by a manufacturer option when the first vehicle is purchased new.

* * * * *